June 5, 1934.  F. B. FULLER  1,961,661
WRAPPING MACHINE
Filed Oct. 23, 1931   10 Sheets-Sheet 4
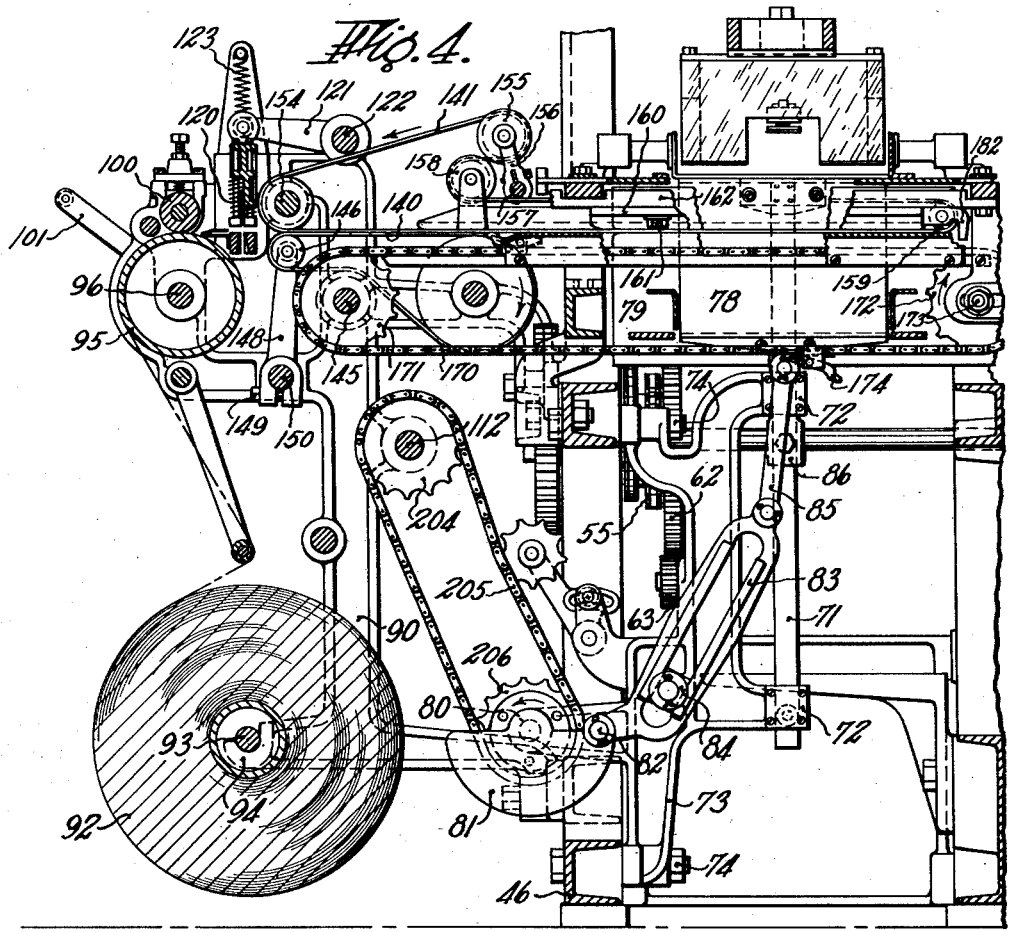
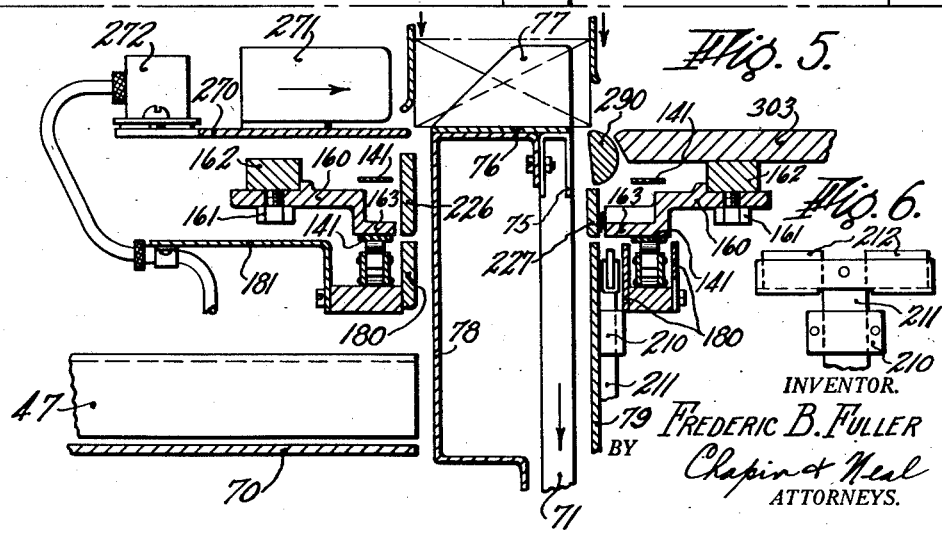
INVENTOR.
FREDERIC B. FULLER
BY Chapin & Neal
ATTORNEYS.

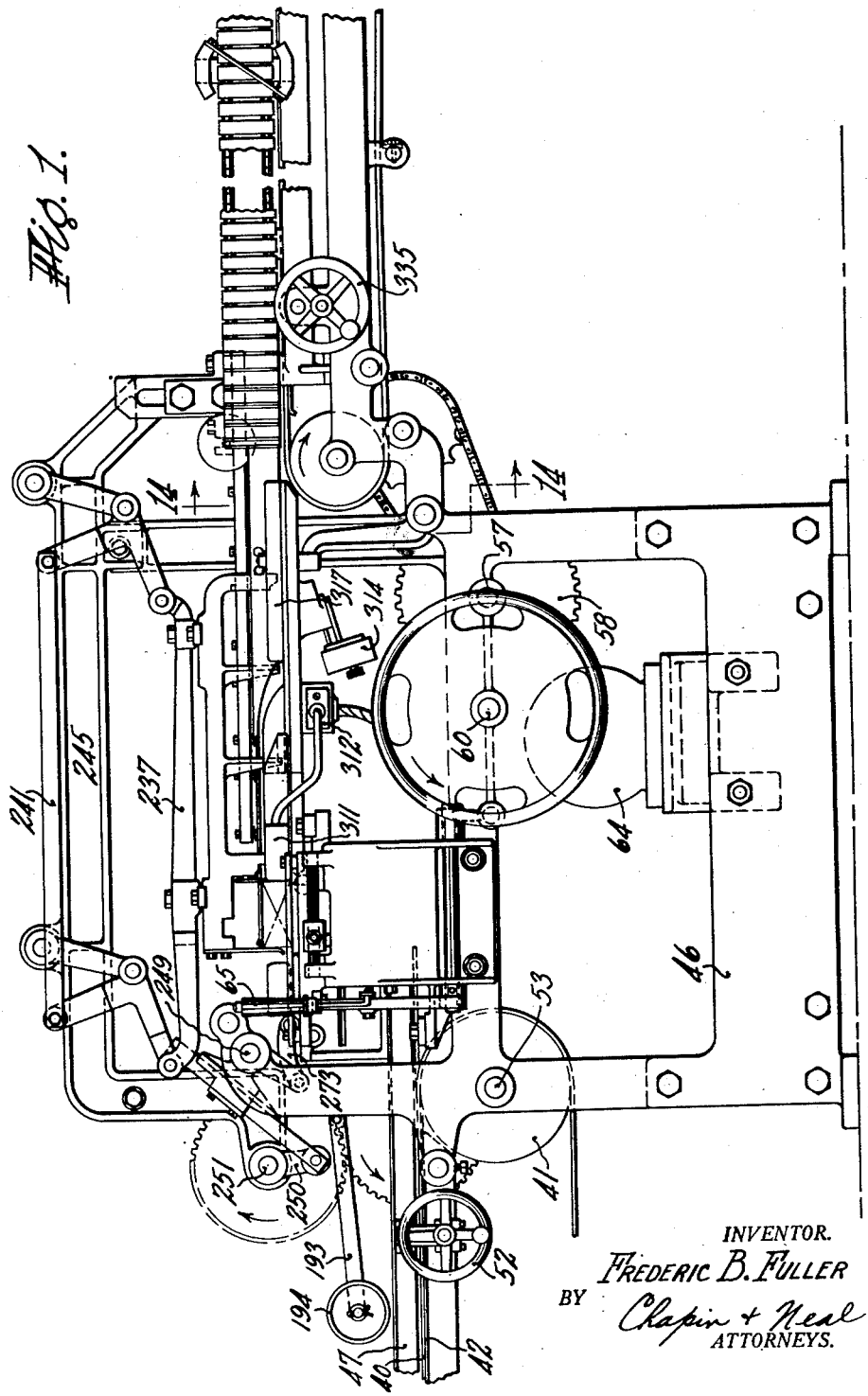

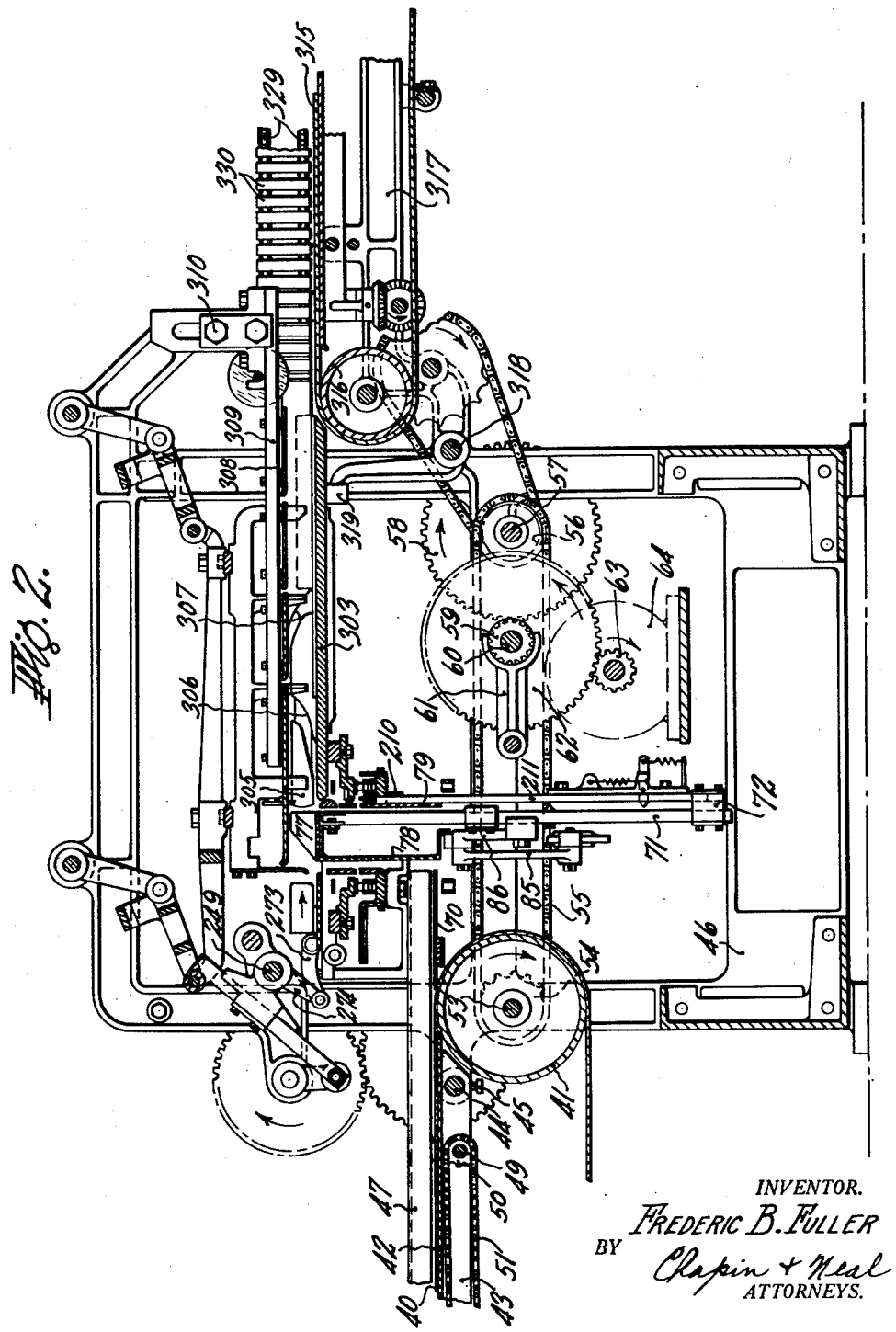

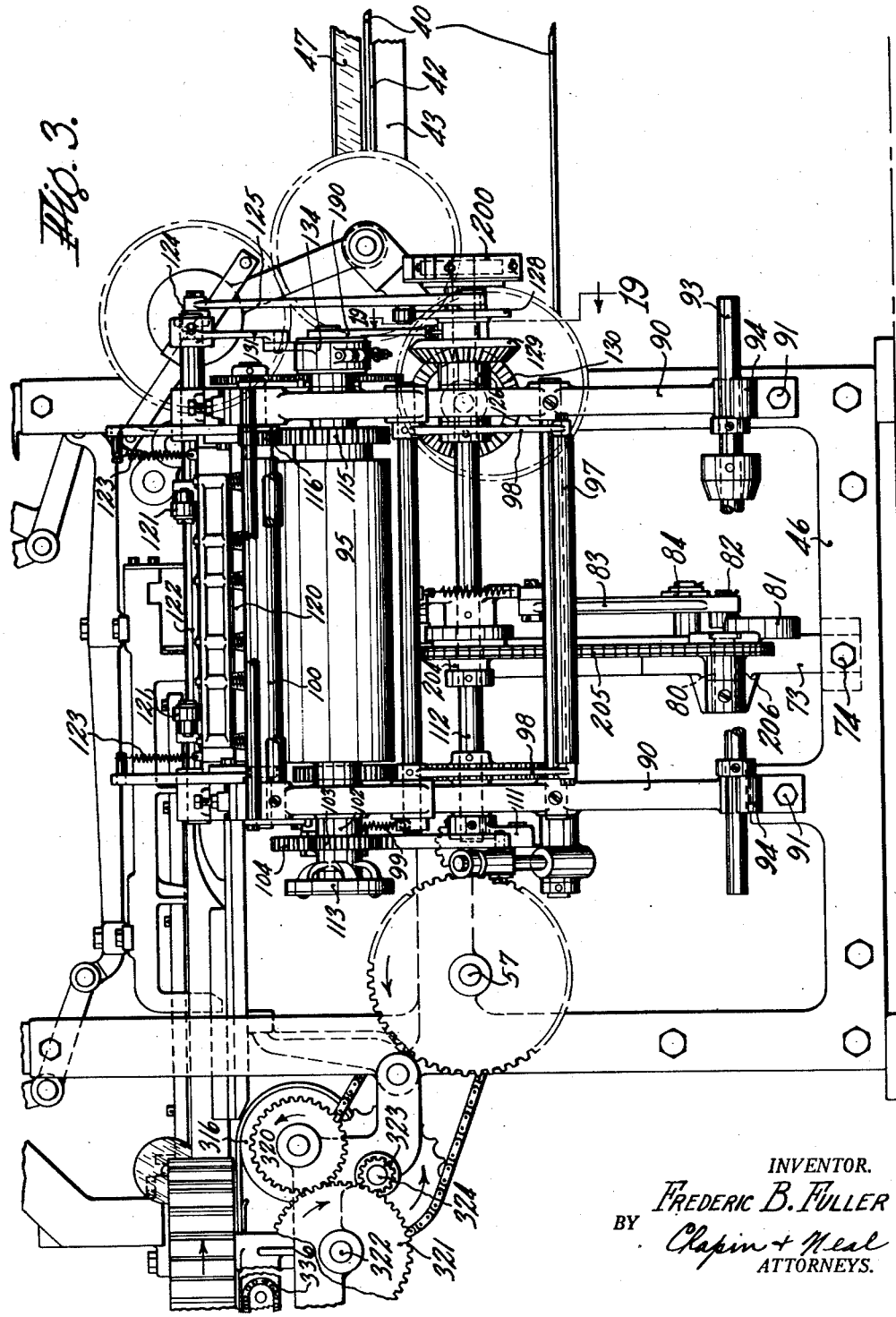

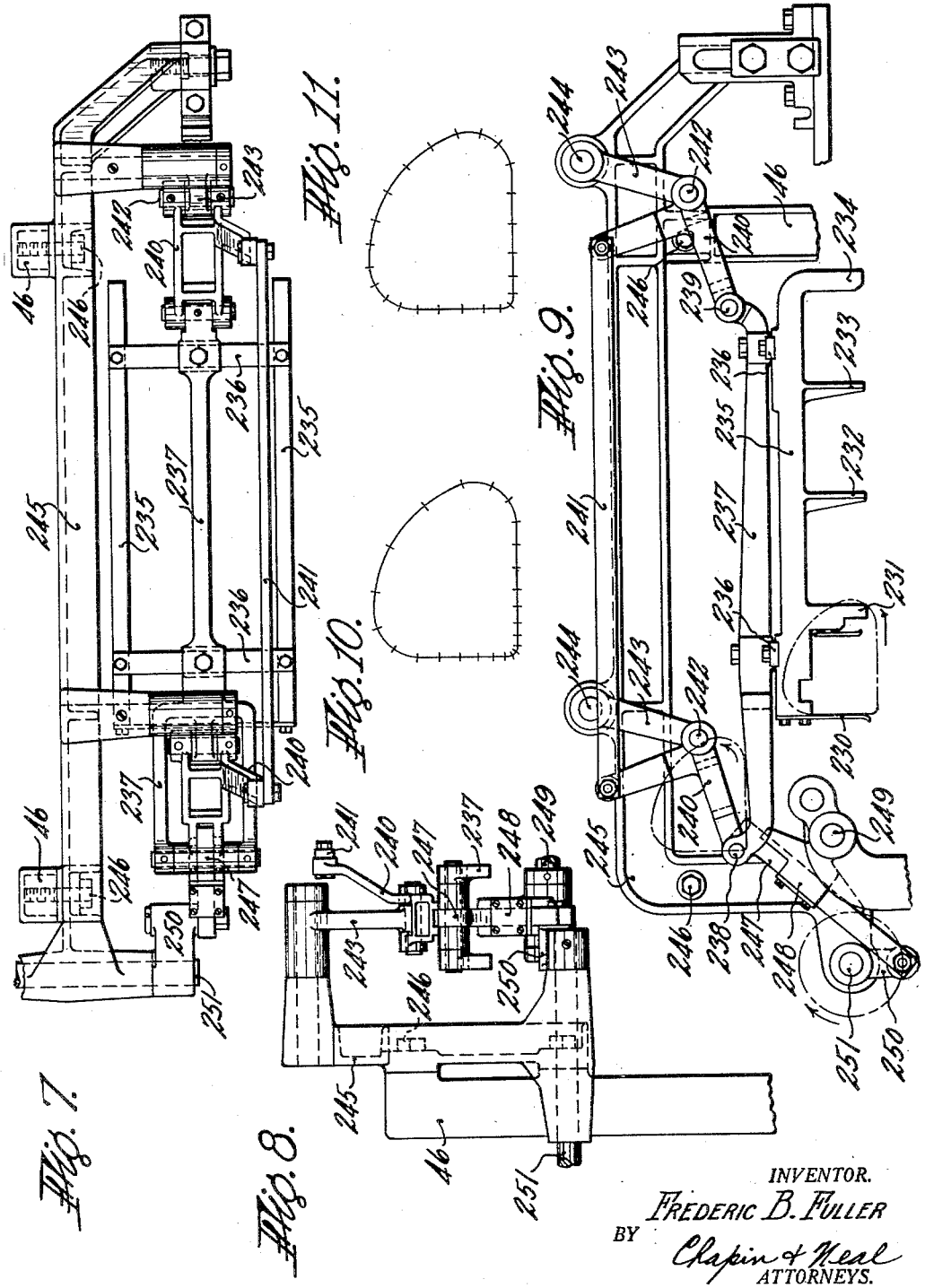

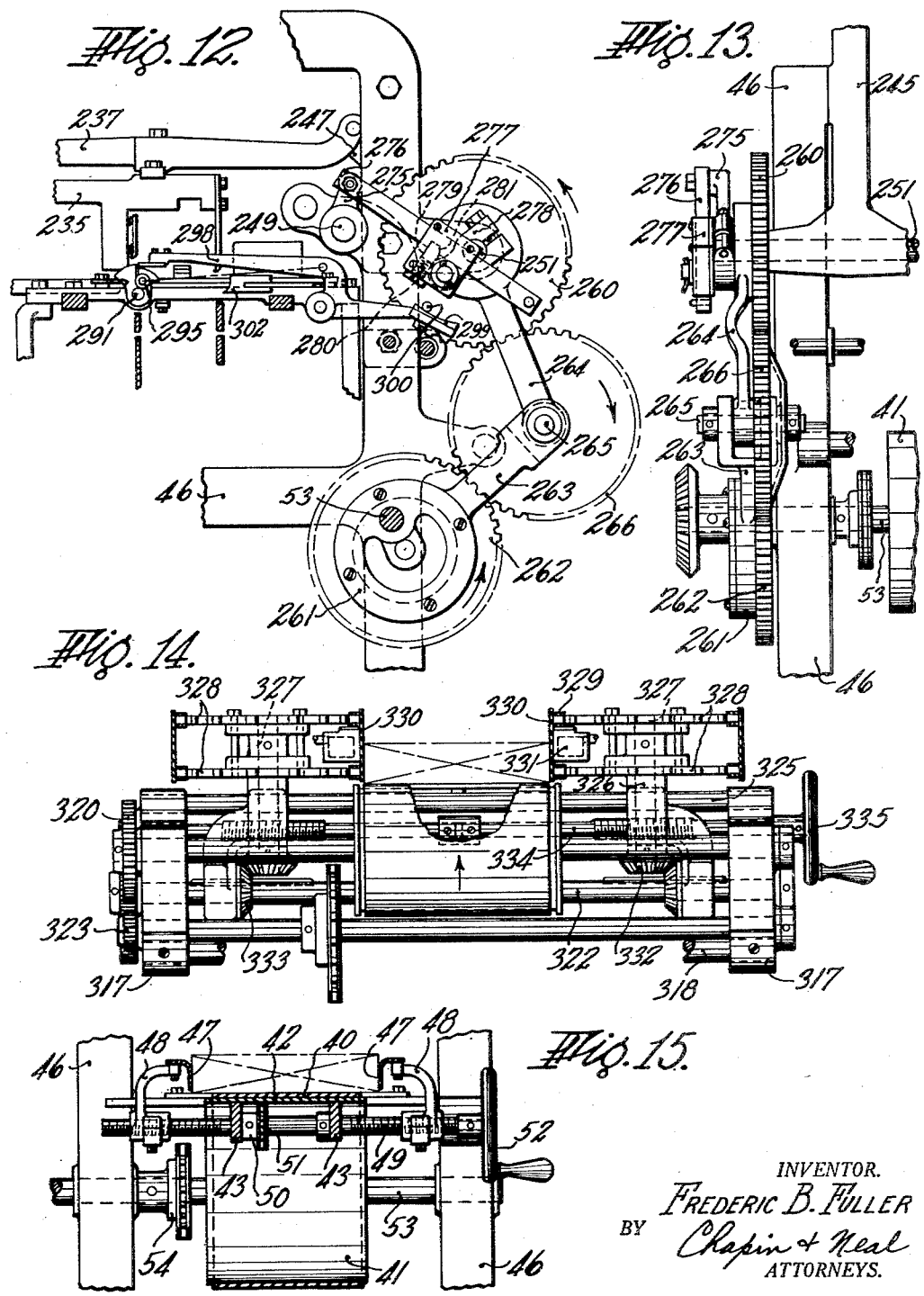

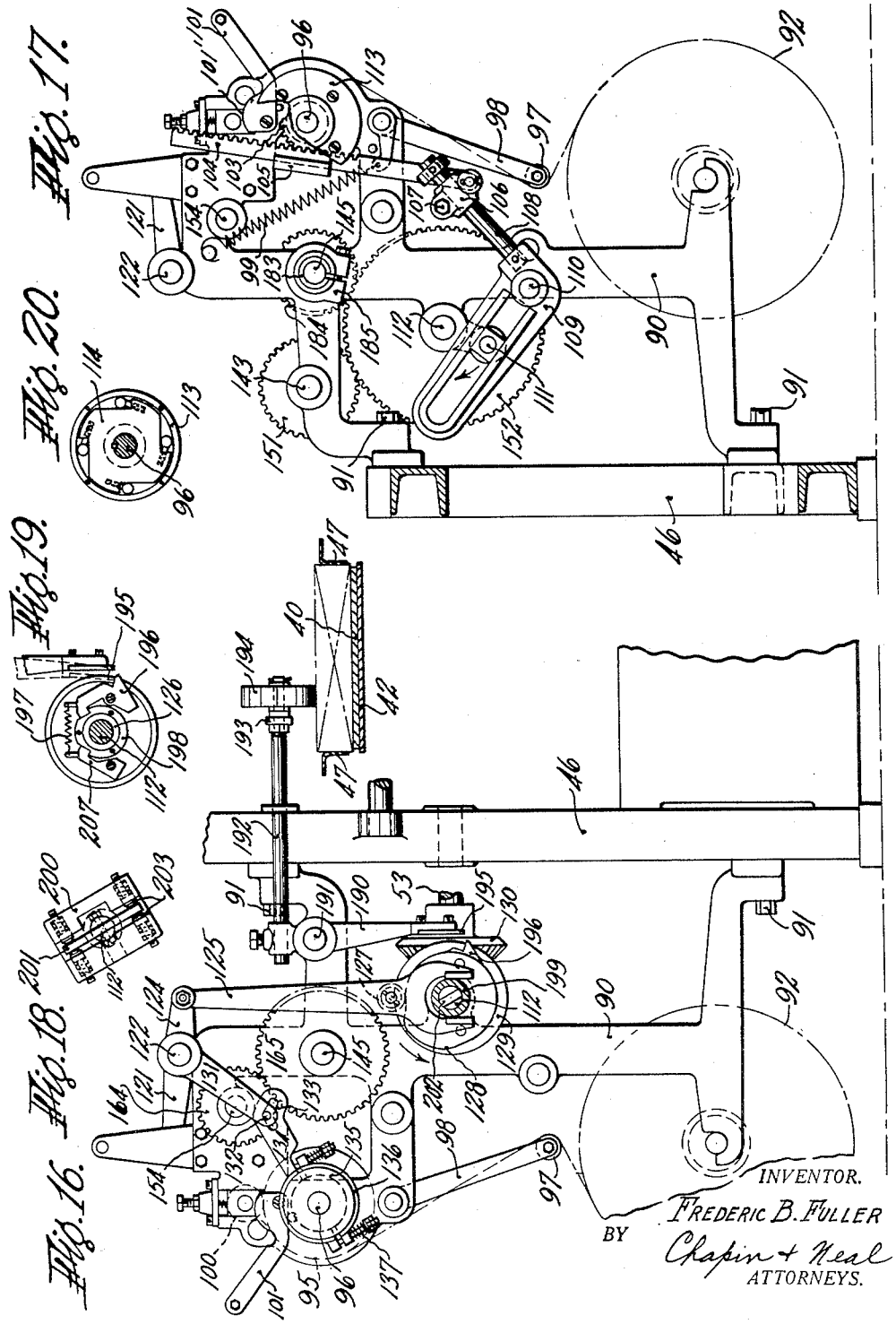

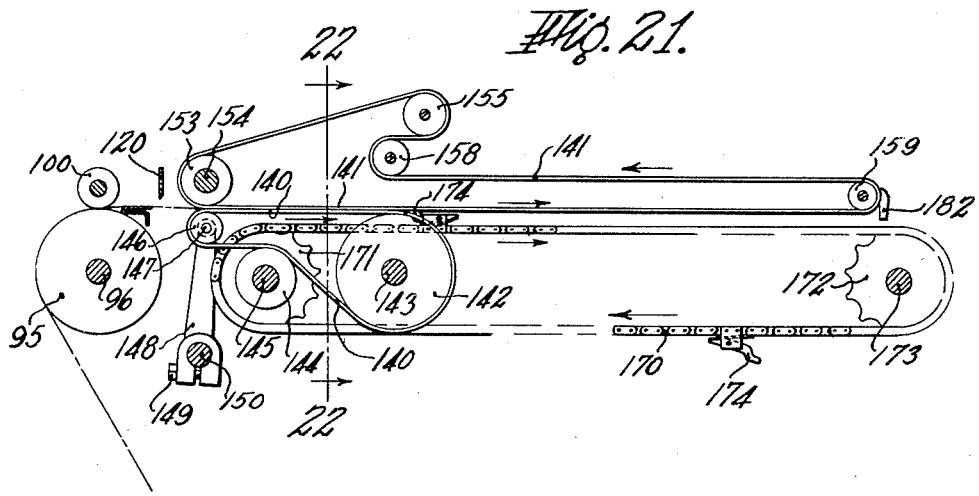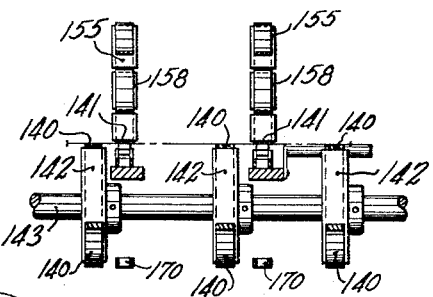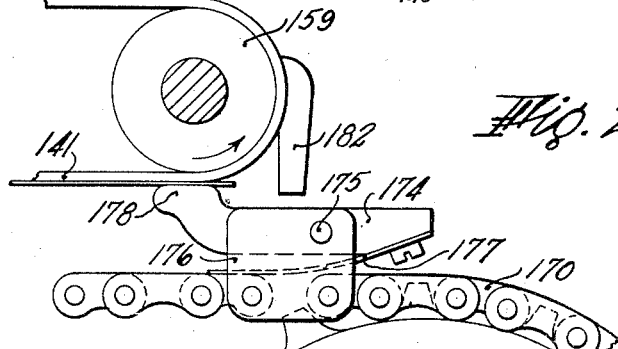

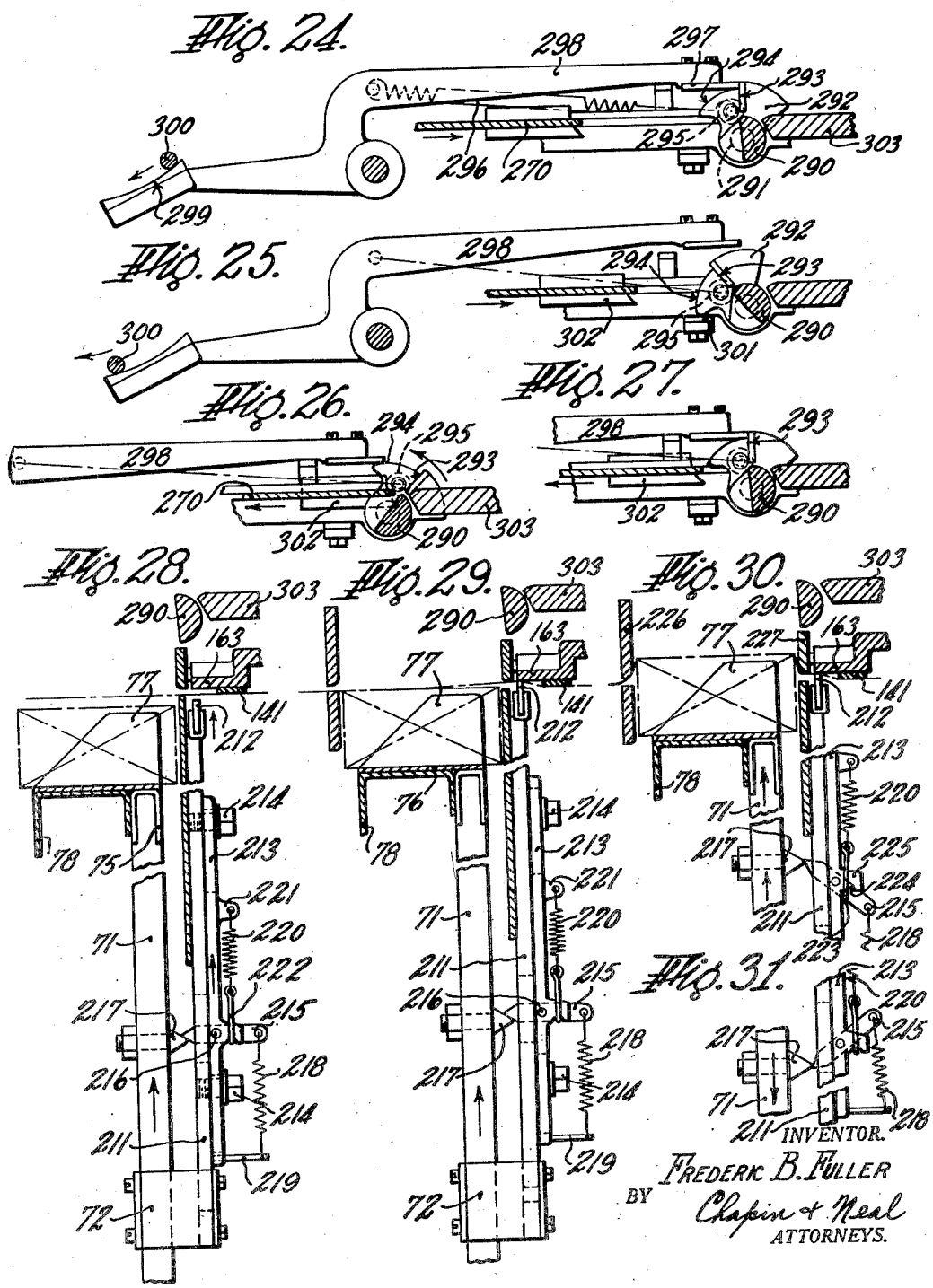

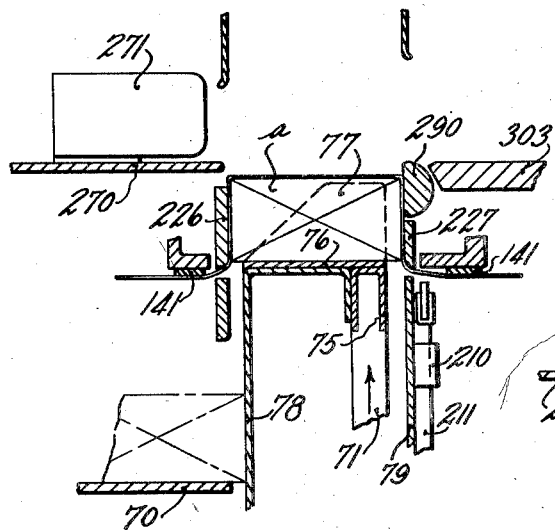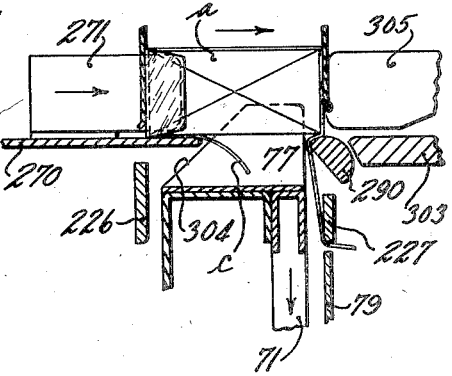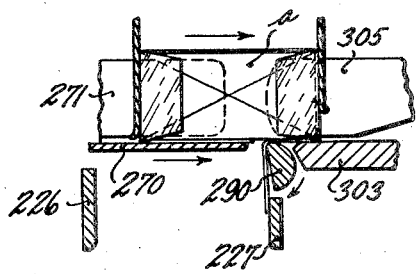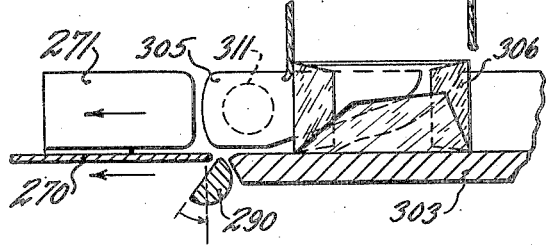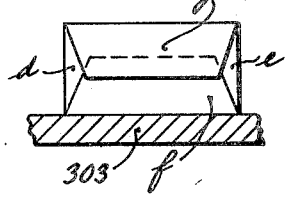

Patented June 5, 1934

1,961,661

UNITED STATES PATENT OFFICE 1,961,661

WRAPPING MACHINE

Frederic B. Fuller, Springfield, Mass., assignor to Package Machinery Company, Springfield, Mass., a corporation of Massachusetts Application October 23, 1931, Serial No. 570,569

27 Claims. (Cl. 93—2)

This invention relates to wrapping machines, particularly of the type which folds a sheet of wrapping material around an article of generally rectangular form and makes regular folds at each end. One object of the invention is to improve machines of this character in regard to their rapidity and quietness of operation. A further object is to improve the mechanism for forwarding articles through the folding channel, this mechanism being of the type in which a plurality of fingers are moved through a closed path to enter the channel, move along it, and return to their original position; this mechanism being constructed in accordance with the present invention to move each finger into the channel in a straight line, then along the channel in a straight line at right angles to the first, and finally back to its initial position along a path corresponding generally to the hypothenuse of a right triangle, so that a minimum idle motion of the fingers will take place. A further object is to provide improved mechanism for holding the cut wrapper in position during its assembly with the article, so that a tighter wrap and greater precision in positioning the wrapper upon the package will be obtained. A further object is to provide improved mechanism for tightening and folding the second bottom fold around the article. A further object is to provide a wrapping machine which can be assembled in units during its construction, facilitating both its initial assembly and the removal of a group of mechanism in case repair or a change of mechanism is desired. A further object is to provide improved mechanism for controlling the feed of paper in accordance with the presence or absence of an article to be wrapped. Additional objects will appear from the following description and drawings.

Referring to the drawings—

Fig. 1 is a side elevation of a machine embodying the invention;

Fig. 2 is a longitudinal section through the machine;

Fig. 3 is a partial elevation of the machine, looking from the side opposite to that shown in Fig. 1 and taken on a slightly larger scale;

Fig. 4 is a transverse section through the machine, showing the paper feeding and package elevating mechanisms;

Fig. 5 is a detail of mechanism shown in Fig. 2, taken on a larger scale;

Fig. 6 is a detail of a paper clamp, looking from the right in Fig. 5;

Fig. 7 is a top plan view of the article transporting mechanism;

Fig. 8 is an end elevation thereof, looking from the left in Fig. 7;

Fig. 9 is a front elevation thereof;

Figs. 10 and 11 are charts illustrating the path of the transport fingers and their speed in different portions of their path;

Fig. 12 is a detail of the gearing for driving the transport mechanism, and of the driving mechanism for the rear bottom folders;

Fig. 13 is a side elevation thereof;

Fig. 14 is a transverse section through the discharge conveyer, taken on line 14—14 of Fig. 1;

Fig. 15 is a transverse section through the article feeding conveyor;

Fig. 16 is an elevation of the paper feed drive mechanism;

Fig. 17 is an elevation of the paper feed drive mechanism, looking from the side of the paper feed extension opposite to that shown in Fig. 16;

Fig. 18 is an end view of parts shown broken away in Fig. 16.

Fig. 19 is a section on line 19—19 of Fig. 3, showing a portion of the mechanism for controlling the actuation of the paper feed;

Fig. 20 is a detail of mechanism shown in Fig. 17, but with a cover plate removed;

Fig. 21 is a diagrammatic section through the paper feed, corresponding generally to Fig. 4 but with other parts of the machine omitted;

Fig. 22 is a section on line 22—22 of Fig. 21;

Fig. 23 is a detail corresponding to a portion of Fig. 21, but on a larger scale and with the parts in a different position of operation;

Figs. 24, 25, 26, and 27 are details illustrating successive stages in the operation of the bottom folding mechanism;

Figs. 28, 29, 30, and 31 are details illustrating successive stages in the actuation of the device for clamping the paper during its assembly with the article; and Figs. 32, 33, 34, 35, and 36 are details illustrating successive stages in the wrapping of an article.

Before considering the machine in detail its general characteristics and operation will be described. The machine in its general aspect is quite similar to that shown in the Smith and Fuller Patent 1,575,723, March 9, 1926, but has numerous refinements which permit quieter and more rapid operation and a more accurate disposal and folding of the wrapper with respect to the article. These changes could of course be employed upon wrapping mechanisms of different types, but for convenience the description will be confined to the preferred embodiment without burdening the descriptive matter with reference to possible changes of environment of the several groups of mechanism. In a machine of the preferred type, articles are fed by a feeding conveyer to a point above a vertically reciprocating elevator. At timed intervals successive sheets of wrapping paper are delivered to a point above the articles so positioned. As the elevator ascends the article is caused to pick up the paper, which is folded into inverted U-form as the article reaches a position at one end of a horizontal folding channel. An improved mechanism for clamping one edge of the paper during the start of this folding operation has been provided, functioning to hold that edge during a predetermined elevating movement of the article between the initial folders, whereby the sheet is positively and accurately positioned with respect to the side of the article adjacent the clamp and is drawn tightly and smoothly across the article top. At the corner between the vertical chute through which the article is elevated and the horizontal folding channel is a device which will be referred to as a flipper, having a novel action and serving in an improved manner to tighten the folds as the article is elevated, support the partially wrapped article as the elevator recedes, and maintain a continuous support for the article as it enters the folding channel without interference with the action of the rear bottom folder. The passage of the article through the folding channel, the folding elements of which may be of any desired type, is controlled by a transporter of what may be termed a three-motion type, as opposed to the four-motion type previously used.

Article feed—(Figs. 1, 2, and 15)

The articles to be wrapped, which may be of any kind having a generally rectangular or bricklike form, are placed upon a continuously moving endless belt conveyer 40 passing around a pulley 41 at one end and upon an idle pulley (not shown) at the other end. The upper run of the belt is maintained horizontal by passing over a plate 42 carried by a frame 43 which constitutes the support for the entire article feeding extension. This frame is carried at its inner end by a rod 44 detachably secured as by set screws 45 to the main frame 46, and at its outer end by a suitable pedestal (not shown). The detachable connection with the main frame permits the entire article feeding extension to be assembled as a unit and later mounted in the complete machine, a feature which is common to the various groups of mechanism to be described.

The articles are guided during their travel on the belt by side members 47 mounted as best shown in Fig. 15 upon brackets 48 having threaded connection with rods 49, each having a right-hand thread at one end an a left-hand thread at the other. But one of these rods is shown in Figs. 1 and 2, the other being further out on the extension. Both rods bear sprockets 50 which are connected by a chain 51, so that as one of the rods is rotated by a hand wheel 52, both rods are caused to rotate simultaneously. By this means the side members 47 can be adjusted rapidly, always remaining parallel to each other and equidistant from the center line of the belt 40.

The pulley 41 is mounted upon a shaft 53 journaled in the main frame 46. A sprocket 54 upon this shaft is joined by a chain 55 to a sprocket 56 upon a parallel shaft 57. A gear 58 on this shaft meshes with a pinion 59 upon a main drive shaft 60. A clutching device indicated generically at 61 but not shown in detail joins the shaft 60 to a gear 62 meshing with a pinion 63 upon the shaft of a motor 64 which furnishes the drive for the entire machine. The clutch is controlled by the usual handle 65.

Article elevator—(Figs. 2, 3, 4, and 5)

The articles are fed by the continuous belt 40 over a shelf 70 to the elevating mechanism which carries them up to the end folding channel. The elevator is carried by a rod 71 slidable in bearings 72 in a sub-frame 73 (Fig. 4) which supports the entire elevator operating mechanism and is secured to the main frame 46 by bolts 74 so that this unit may be assembled separately before being installed in the main frame. A cross piece 75 (Fig. 5) at the top of the rod 71 carries a platform 76 with upstanding guide plates 77 for the ends of the articles, and a depending plate 78 which blocks off the flow of articles along the shelf 70 when the elevator is raised. A stationary abutment 79 serves to position the articles upon the elevator when it is lowered and to guide them during its ascent.

The mechanism for operating the elevator is preferably of the type shown in the patent to Fuller 1,788,098, January 6, 1931, and reference is made to that patent for a full discussion of the manner in which the linkages operate. The parts are shown in Fig. 4 of the present case in positions corresponding to those of Fig. 2 of the Fuller patent. A shaft 80 journaled in the sub-frame 73 is rotated constantly during the normal operation of the machine by means which will be described below in considering the paper feed. A crank plate 81, preferably substantially semicircular so as to contribute to the dynamic balance of the elevator mechanism, is pivoted at 82 to one end of a slotted member 83 which slides upon a block 84 pivoted in the sub-frame. The other end of the slotted member is joined by a link 85 with a bracket 86 on the rod 71 which carries the elevator.

Web feed—(Figs. 3, 4, 16, 17, and 20)

The paper feed is designed to cut individual wrapping sheets from a roll of paper, cellophane, or other wrapping material, and to forward the cut sheets into registration with the article which is being raised by the elevator. The entire paper feed mechanism is supported on a sub-frame 90 which is attached to the main frame 46 by bolts 91. Similarly to the other unit mechanisms described, the paper feed may be assembled as a separate unit and secured subsequently in the complete machine. A roll of paper 92 is mounted upon a cross shaft 93 rotatable in open top journal boxes 94. From the roll the paper web is drawn over a steel roll 95 fixed on a cross shaft 96, passing in its way under a tension roll 97 mounted on arms 98 subjected to a steady torque by a spring 99 as shown in Fig. 17. A cork surfaced roll 100 is spring pressed down upon the roll 95 to give a positive grip to the paper. A lever 101 having a cam surface 101' may be provided to lift the shaft of the cork roll when it is desired to insert the leading end of a new web.

The roll 95 is driven by an improved ratchet mechanism permitting very fine adjustment of the length of paper fed at each cycle. For this purpose one end of the shaft 96 is surrounded by a free sleeve 102 (Fig. 3) having a pinion 103 fixed to it, the pinion meshing with a rack 104 reciprocable in a guide 105 (Fig. 17) pivoted about the sleeve. The lower end of the rack is connected to a block 106 adjustably secured by a bolt 107 upon the rod-like end 108 of a bell crank lever 109 pivoted at 110 to the sub-frame 90. The other end of the bell crank is slotted to receive a crank 111 fast upon the end of the main paper feed drive shaft 112. Secured to the sleeve 102 is the outer member 113 of a ball ratchet or free wheeling unit, the inner member 114 (Fig. 20) of which is fixed to the shaft 96. This construction permits the adjustment of the length of paper fed at each cycle to any desired degree of fineness, by changing the position of the block 106, instead of having the adjustment limited to multiples of the pitch of the ratchet teeth as in prior constructions. It has the further advantage of being noiseless in action. The shaft 112 is driven continuously during the normal operation of the machine, as will be described in considering the paper feed trip below. As the roll 95 rotates, the roll 100 is rotated at an equal peripheral speed by means of gears 115 and 116 (Fig. 3).

After the paper web leaves the rolls 95 and 100 it passes under a vertically reciprocable knife 120 (Fig. 4) which may be standard in its detailed construction and is, therefore, not described in detail. The knife is actuated at intervals by arms 121 on a shaft 122, which push the knife downwardly against the action of springs 123 to sever the paper. Shaft 122 has an arm 124 (Fig. 16) to which is coupled a link 125 forked at its lower end to straddle the shaft 112. A cam roll 127 on the link rides upon a cam 128 secured to the shaft as set forth below. A sleeve 126 on the shaft carries a bevel gear 129 meshing with a bevel gear 130 on the end of the shaft 53, so that it rotates constantly during the operation of the machine. In normal operation the sleeve is coupled to the shaft 112 so that the latter is also continuously rotated, the two being disconnected only when the paper feed trip is operated as described below by discontinuity in the delivery of packages.

The shaft 122 also bears an arm 131 (Fig. 16) having at its free end a pin 132 passing into a slot 133 in one end of an arm 134. This arm is formed as a semi-circular brake band encircling a drum 135 on the roll shaft 96. A second semi-circular brake band 136 is joined to the first by springs 137, so that a contant restraint is placed upon the rotation of roll 95, preventing any tendency to overrun. In addition, to this action, a slight backward motion of the roll 95 is given at each elevation of the paper knife by the arm 134, the slot 133 permitting the knife to descend without effect on the roll. The backward rotation of the roll 95 is allowed because of the ball ratchet 113, 114 which joins it to the operating mechanism. This short reverse rotation after the completion of the cutting operation is of value in freeing the paper from the knife, a tendency to stick being sometimes bothersome in the case of wax-treated paper webs.

*Sheet delivering mechanism—(Figs. 4, 5, 16, 17, 21, 22, 23)*

As the paper is projected past the knife by the intermittently operated feed rolls 95, 100, the leading end of the web is projected between lower and upper sets of belts 140 and 141 (Figs. 21 and 22). These belts are not arranged in pairs but are staggered, there being two upper belts offset from the three lower ones. The lower belts pass around pulleys 142 on a shaft 143, around guide pulleys 144 loose on a shaft 145, and around pulleys 146 on a shaft 147 held in arms 148 adjustably secured by clamp bolts 149 to a rod 150. The shaft 143 is provided with a gear 151 (Fig. 17) meshing with a gear 152 on the paper feed drive shaft 112. The upper belts 141 pass around rolls 153 (Fig. 21) on a shaft 154, around idlers 155 mounted on arms 156 (Fig. 4) adjustably mounted on a rod 157, and around pairs of rolls 158 and 159 mounted on opposite ends of a slide 160 (Figs. 4 and 5) adjustably secured by bolts 161 to a portion 162 of the main frame. The slide 160 also has shoe portions 163 (Fig. 5) which rest upon the upper surfaces of the lower runs of the belts 141 to provide a backing against which pressure may be exerted by the paper-carrying grippers. The rolls 158 and 159, being mounted on the same slide, move back and forth with the slide to vary their position without affecting the length of the belts, as is best shown in Fig. 21. The shaft 154 is provided with a gear 164 (Fig. 16) meshing with a gear 165 on the shaft 145 previously referred to.

Situated directly below the belts 141 (Fig. 22) are a pair of chains 170 running around sprockets 171 and 172 (Fig. 21). The sprockets 171 are secured to the shaft 145 and the sprockets 172 to a shaft 173 adjustably mounted in the frame as shown in Fig. 4, so that chain wear may be taken up. Attached to each chain are a plurality (two as shown) of grippers 174 (Fig. 23) pivotally attached at 175 to clips 176 secured to links of the chain. A flat spring 177 is secured to the gripper and presses against the chain to urge the paper-contacting surface 178 of the gripper outwardly.

The operation of the sheet-delivering mechanism will now be considered. As the feed rolls 95 and 100 first start to rotate at the beginning of a cycle the leading end of the paper web is fed first past the knife 120 and then between the staggered belts 140 and 141. These belts are continuously rotating, but due to their staggered relation they do not grip the paper. Rather do they exert what may be called a stroking action on the paper exerting enough friction to keep the leading end of the web extended beyond the knife. When the paper feed rolls stop, the forward movement of the web of course stops also; while the belts continue to move at their same steady rate, slipping over the extended end of the web until it is cut off by the action of the knife. During this same period a pair of grippers 174 (one on each chain 170) are carried around the sprockets 171 so that their surfaces 178 press the web against the under surfaces of the belts 141. Here again the pressure is not great enough to prevent slipping of the continuously moving grippers while the end of the web is held stationary, but is merely sufficient to hold and carry the cut sheet after severance. At the time when the knife is actuated the grippers are adjacent the leading end of the web, the chains being adjusted as will be described below to the proper timing for the size of the sheet to be cut.

At the instant of severance the cut sheet is held between the belts 140 and 141 and between the belts 141 and the grippers 174. Both sets of belts and the chains 170 move with the same constant surface speed. It will be noted that the upper set of belts 141 and the chains extend beyond the lower belts, support of the under surface of the cut sheet (held by the grippers at its front edge only) being assumed by guide members 180 (Fig. 5), a plate 181, and the upper end of the back plate 79 as soon as the sheet passes beyond the range of belts 140. The termination of the feeding action of the grippers is brought about merely by their running beyond the point where belts 141 curve up around their pulleys 159 (Fig. 23). A paper stop 182 is secured to the slide 160 to check the momentum of the traveling sheet and to insure that it comes to rest in a definite location.

Adjustment of the paper feed for sheets of different length is accomplished by three adjustments. The length of sheet to be cut is determined solely by the amount of rotation given at each cycle to the feed rolls 95, 100, a matter goverened by the position of the block 106 (Fig. 17). The knife always operates at the same point in the machine cycle. When the length of sheet is varied, however, it is generally desirable to center it with respect to the package on the elevator, which requires an adjustment of the point to which the cut sheet is delivered by the grippers. As pointed out above, this is accomplished merely by shifting the slide 160, which varies the position of roll 159 and hence the point at which the tractive power of the gripper ends, and at the same time varies the position of the paper stop 182.

One further adjustment is necessitated by the desirability of having the grippers 174 adjacent the leading end of the cut sheet during its travel. It will be recalled that the end of the web is projected past the knife by the intermittent feed rolls and is then held stationary in the interval between the stoppage of the rolls and the actuation of the knife, the grippers meanwhile slipping over the paper. With different lengths of sheet it will be ovious that the grippers need to be in different positions at the time the knife cuts. Provision for this is found in the drive for the shaft 145. A split sleeve 183 (Fig. 17) surrounds the shaft and projects with it through the frame 90. Upon this sleeve within the frame is fixed a gear 184 meshing with the gear 152 previously mentioned. A clamp 185 is mounted on the sleeve outside the frame so that it can be secured to the shaft in any angular position desired. By loosening this clamp the chains 170 can be shifted so as to bring the grippers into proper registration with the end of the web at the instant of cut, this registration being preserved for further cycles by tightening the clamp.

*Paper feed control mechanism—(Figs. 1, 3, 16, 18 and 19)*

As is customary in machines of this character, mechanism is provided for stopping the feed of paper if no article is present to be wrapped. A lever 190 (Fig. 16) is pivoted on a stud 191 projecting from the sub-frame 90. To the upper end of this lever a rod 192 is secured, bearing a second rod 193 (see Fig. 1) carrying a roller 194 positioned to ride on the top of packages being carried on the belt 40. The lower end of the lever 190 has a contact plate 195 normally positioned, as in Fig. 16 and the full line position of Fig. 19, out of the way of the tail of a pawl 196 pivoted to the cam 128 and drawn by a spring 197 so as to engage a ratchet 198 on the sleeve 126. As long as the ratchet is engaged by the pawl the cam and sleeve are coupled together. Absence of a package under the roller 194 will permit the lever to swing to the dotted line position of Fig. 19, in which the contact plate 195 strikes the tail of the pawl, simultaneously disconnecting the cam and its associated parts from the driving sleeve and arresting them in their rotation. The cam has a hub 199 to which is secured a shock absorber 200 (Fig. 18) grooved to receive a vane 201 engaging a slot 202 (Fig. 16) in the end of the shaft 112. Spring plungers 203 between the vane and the shock absorber furnish the coupling between the cam (which carries the pawl 196) and the shaft so that the shock of starting and stopping the pawl will be deadened in transmission to the remaining mechanism.

The shaft 112 carries a sprocket 204 (Figs. 3 and 4) connected by a chain 205 with a sprocket 206 on the shaft 80 which drives the elevating mechanism, so that the absence of a package stops both the paper feed and the article elevator. Due to the high speed of reciprocation of the parts forming the elevating mechanism it has been found that a tendency exists for the latter during its periods of deceleration to cause the shaft 112 to overrun its driving mechanism, resulting in irregular movement of the paper feed. To prevent this a second pawl 207 (Fig. 19) has been mounted on the cam 128 so as to engage a notch in the ratchet 193 under the influence of spring 197. The two pawls 196 and 207 act upon the ratchet in opposite direction and when both are engaged prevent relative movement of the ratchet and the cam in either direction.

It will be noted that the paper feed stop operates to stop both the paper feed and the article elevator. This prevents waste of paper and jamming of the machine with unused packages; and also, by stopping the elevator, prevents breakage due to the presence above the ascending elevator of a package incompletely positioned due to the absence of a full line of articles on the shelf 70 between the belt 40 and the elevator.

*Paper clamp (Figs. 2, 5, 6, 28, 29, 30, and 31)*

In order to insure accurate positioning of the cut wrapper sheet relative to the article, and to draw it tightly over the upper side of the article during the start of the formation of the first U-fold, a clamp has been provided which holds the paper at one edge only to the lower side of one of the shoes 163 which overlie the belts 141. Mounted for a short vertical reciprocation in the elevator guide 72 and in a bearing 210 attached to the back plate 79 is a slide 211 carrying at its top pads 212 adapted to contact with the paper as in Figs. 29 and 30. To this slide a member 213 (Fig. 28) is secured by bolt and slot connections 214 so as to possess an adjustment in a direction along the length of the slide. A detent 215 is pivoted at 216 to the member 213, and projects freely through a slot in the slide in position to be struck by a wedge-shaped cam 217 secured upon the elevator rod 71. A light spring 218 is stretched between the rear end of the detent and a post 219 on the member 213; but its action is normally nullified by a heavier spring 220 attached at one end to an ear 221 and at the other to a bail 222 passing around an intermediate portion of the detent and fitting into a notch 223 (Fig. 30) therein. When the springs are given free play the spring 220 contracts until its bail rests in a notch 224 in a lug 225 extending from the member 213.

When the elevator first starts to ascend the cam 217 is well below the detent 215. Just previous to contact of the article with the paper (Fig. 28) the cam strikes the detent. As there is no resistance to the motion of the slide 211 at this time the spring 220 holds the detent in its horizontal position, permitting the cam to raise the slide until the pads 212 press the paper against the shoe 163 as in Fig. 29. The slide is thus stopped in its upward movement and further upward movement of the cam with the elevator tilts the detent until the cam passes entirely by it. Fig. 30 shows the position of the parts just prior to the release of the detent. As soon as this release occurs the slide drops and the paper is released. During the descent of the elevator the spring 218 permits the detent to tilt in the reverse direction without effect on the slide (Fig. 31).

The clamping action of the pads 212 is positive, and effective upon one side of the paper sheet only. The paper is thus held clamped against shifting at the instant of contact by the article, and is held clamped for a length of elevator travel thereafter which is determinable by varying the adustments 214. As the package rises from the position of Fig. 29 through that of Fig. 30 it passes between a fixed side plate 226 (Fig. 5) and a spring-pressed side plate 227 which fold the wrapper around the article in inverted U-form (Fig. 32). The wrapper being clamped at one side only, it is drawn tightly across the top of the package; and since it is released at a predetermined point in the article travel the location of the edges of the wrapper will always be held constant with respect to the sides of the package.

*Transport mechanism—(Figs. 1, 2, and 7 to 13 inclusive)*

It is usual in machines of this type to carry the articles step by step through a horizontal folding channel by a transport device having fingers moving into, along, and back out of the channel. Examples of this type of mechanism will be found in the Smith and Fuller Patents 1,575,723 and 1,791,171. In the present machine the transporter is given a motion more perfectly adapted to the work in hand than in any previous device, particularly in avoiding unnecessarily long travel in inactive portions of its stroke. The transporter comprises two series of pushing fingers 230, 231, 232, 233, and 234 (Fig. 9) formed on members 235 (Fig. 7) carried by bars 236 extending transversely from a longitudinal frame 237. The two ends of this frame are pivoted at 238 and 239 (Fig. 9) to the horizontal arms of two substantially right angled bell cranks 240, the vertical arms of which are joined by a link 241. The bell cranks themselves are pivoted at 242 to links 243 suspended at 244 from a sub-frame 245. The sub-frame is joined to the main frame 46 by bolts 246 so that the transporter can be assembled as a unit. Pivot 238 is joined to a rod 247 sliding in a guide 248 swinging freely upon a shaft 249; the rod being joined at its other end to a crank 250 formed on a shaft 251.

With the linkages proportioned as shown, all parts carried by the transport frame 237, including the transport fingers, move through a path 253 shown in Fig. 9 and on a larger scale in Figs. 10 and 11. The diagram in Fig. 10 is divided into divisions representing equal angular motion of the shaft 251, and therefore equal times if the shaft runs at a uniform speed. It will be seen that the path is generally triangular in form, comprising a straight side where the transport fingers enter the channel, a second straight portion carrying the fingers along the channel, and a slanting portion taking the fingers back to their original position with the least possible waste motion. The two portions of the path at right angles to each other are for all practical purposes exact straight lines, and are joined by an arc of small curvature. It will be observed from the time divisions on Fig. 10 that the slowest movement is adjacent the junction of the two paths, so that the partially wrapped article will be picked up smoothly; and that the greatest speed is in the idle portion of the path. This is a very desirable condition since the only operation done on the package which requires it to be substantially stationary is the formation of the rear bottom fold, and furthermore, the package is handled most easily before the bottom folds are fully made.

The device as described is eminently suited for comparatively small machines where the inertia of the moving parts is not large. The machine illustrated, however, is particularly intended for wrapping large packages, and the inertia of the transport mechanism is so great at high speeds that it may be desirable to compromise the advantages of the speed distribution of Fig. 10 for the benefits of freedom from vibration. The result of this compromise is shown in Fig. 11 and the mechanism for producing it in Figs. 12 and 13.

As shown in these latter figures, the shaft 251 bears a gear 260. Secured on the end of the shaft 53 previously referred to is an eccentrically mounted gear 262. A yoke 263 is pivotally held concentrically upon the eccentric gear 262 by a cap 261, and together with a link 264 pivoted upon the shaft 251 embraces a shaft 265 forming the support for a third gear 266. The yoke 263 and the link 264 form a floating support for the intermediate gear 266, allowing it to follow the eccentric movement of gear 262 but keeping it always in mesh both with that gear and with the gear 260. This train of gearing functions somewhat after the manner of elliptical gears to introduce a variable speed into the rotation of shaft 251, but with greater accuracy and without increasing the maximum speed as greatly. The result of this variation in speed is shown by the time divisions on Fig. 11, which represent distances traveled by the transport in equal times. It will be seen that the range of speed has been compressed, so that stresses due to rapid acceleration and deceleration of the transport parts will be materially reduced.

*Rear bottom folder—(Figs. 1, 2, 5, 12, 32, and 33)*

Slidable in suitable ways on the machine frame is a rear bottom folding plate 270, adapted as shown in Fig. 33 to pass under the article *a* when it is at the top of the elevator chute and to turn under the rear bottom fold *c* of the wrapper. Tucking plates 271 are carried by this folder to turn in the rear end tucks *d* (Fig. 36). In order to prevent sticking of wax to the folder in case paraffin paper is used as a wrapping material, a heater 272 (Fig. 5) of conventional electrical type may be provided. This heater is not primarily for the purpose of forming a seal but to maintain the folding blades in such a condition as to prevent adherence of wax, and may therefore be operated at a temperature below that required for sealing.

The folder 270 is joined by a link 273 (Fig. 2) with a crank 274 fixed on the shaft 249 on which the guide 248 was pivoted. A second crank 275 (Fig. 12) on the shaft 249 is joined to a link 276 which slides in a guide 277 on a crank 278 secured to the shaft 251. Normally a pawl 279 causes the link and the guide to act as a unit, the pawl being pressed by a spring 280 into a notch 281 in the link. If, however, undue resistance to the movement of the folder develops due to the mispositioning of a package or other cause, the pawl will ride out of the notch, automatically disconnecting the folder until it is manually reset. The motion given to the shaft 249 is oscillatory, and has no connection with the oscillatory movement of the guide 248, which treats the shaft merely as a stationary pivot.

*Flipper mechanism—(Figs. 12, 24, 25, 26, 27, 32, 33, and 34)*

When the package is at the top of the elevator chute it must be supported so that it will not fall as the elevator goes down. At the rear side of the package this support is assumed by the rear folding plate 270, as shown in Fig. 33. At the front side the package is supported by a flipper which performs also the duty of tightening the wrapper around the article and snubbing it under the rear bottom corner. This device comprises a bar 290 extending across the corner between the folding channel and the elevator chute, and pivoted in the frame on bearings 291 (Fig. 12). The bar has a semicircular cross-section, rounded at the corners. At one end the bar carries an operating plate 292 (Fig. 24) having a radial abutment 293, an arc-shaped bearing surface 294, and a shifting roll 295. Normally the device is held against the turning action of a spring 296 by a stop plate 297 carried upon an arm 298 and resting against the abutment 293. The opposite end of arm 298 has a cam plate 299 adapted to be moved slightly by a stud 300 carried by the gear 260 as shown in Fig. 12. When the cam plate is depressed the stop plate 297 will be raised clear of the abutment, permitting the spring 296 to rotate the bar until the end of the surface 294 contacts with a leather stop 301 (Fig. 25). A plunger 302 on the bottom folder 270 is positioned to strike the roll 295 and move the bar back past its upright position as shown in Fig. 26. When the folder recedes the arm 298, now released by stud 300, catches the abutment 293, as in Fig. 27, and stops the bar in its initial position.

The operation of this device will now be considered. In its normal position the flat face of the bar is slightly inclined to the vertical (Fig. 30) with its center directly above the adjacent edge of the ascending article. As the package rises (Fig. 32) the bar will be straightened into vertical position by the contact, this being resisted by the spring 296 so that a yielding wiping action will be exerted along the side of the article. By the time that the article has reached its upper limit of motion the arm 298 has been swung by the stud 300 so that the bar is free to snap to the position of Figs. 25 and 33 under the influence of the spring. As is seen in the latter figure, this causes the bar to turn in the wrapper tightly around the bottom corner of the package and to assume the support of its forward edge. As the transport now moves forward the bottom corner is carried onto the bottom plate 303 of the folding chute, while the bar is turned to the position of Fig. 35 by the plunger 302 to permit the rear folder to carry the rear bottom fold closely adjacent the plate 303. It may be pointed out at this time that the elevator is somewhat narrower than the vertical chute so that the folder 270 and the bar 290 have a chance to get under the corners of the article before the elevator recedes, and that the guide plates 77 are cut away as at 304 (Fig. 33) so that they will not interfere with the folding of the rear flap by the folder 270.

*End folding and discharge mechanism*

The mechanism by which the end folds are made does not in its detail affect the features of invention described above. As shown, the front tucks *e* are made by stationary folders 305 (Figs. 2 and 34), the bottom folds *f* by a stationary folder 306, and the upper folds *g* by a stationary folder 307. During the passage of the articles along the plate 303 they are held down by spring plates 308 carried by a bar 309 adjustably held in the transport sub-frame by a bolt and slot connection 310. The plates 305, 303, and 307 may be heated by the usual electric resistance elements 311, 312, and 313 respectively, controlled by a thermostat 314 (Fig. 1).

The wrapped articles pass from the plate 303 onto a belt 315 (Fig. 2), which passes around a pulley 316 and a second pulley (not shown) on the discharge extension frame 317. This frame is supported on its outer end by a pedestal (not shown) and at its inner end by a connection 318 with the main frame 46. The pulley 316 is driven by a gear 320 (Fig. 3) which meshes with a gear 321 on a shaft 322. Also meshing with the gear 321 is a pinion 323 on a shaft 324 which is driven by a chain and sprocket connection with the shaft 57 previously mentioned. Slidable on rods 325 (Fig. 14) extending between opposite sides of the frame 317 are members 326, each supporting a pair of vertical shafts 327, the top of each of which carries a pair of spaced sprockets 328. Chains 329 pass around these sprockets and carry metal plates 330 which act as the sides of a moving trough traveling with the packages as they are carried along by the belt 315. Cooling boxes 331, preferably fitted to permit circulation of water, abut the plates to maintain them against the package ends and to keep them at a temperature which will solidify the wax melted by the heaters. If a glue instead of a wax seal is used these boxes may be heated to serve as driers. In order to permit the chains to be moved towards and from each other in order to accommodate articles of different lengths, the shafts 327 are driven by bevel gears 332 and 333, the latter of which are splined to the shaft 322 so as to be slidable thereon. A pair of rods 334 (one only being shown) extend through the frame 317 and have right and left threaded portions threaded into the two members 326. One of the rods carries a handwheel 335, and the two rods are connected by a chain and sprocket 336 (Fig. 3), so that a ready adjustment can be had in a manner similar to that described for the article feed belt.

The operation of the machine has been considered in detail in the description of the several parts, and need not be summarized here.

I claim:

1. In a wrapping machine having a folding channel, a transporter having article-engaging fingers, and mechanism for imparting to the transporter a motion carrying the fingers with a parallel movement in a straight line into the channel, then in a straight line along the channel, and finally in a diagonal direction back out of the channel.

2. In a wrapping machine having a folding channel, a transporter having article-engaging fingers, and mechanism for imparting to the transporter a motion carrying the fingers with a parallel movement through a closed path having the general form of a right-angled triangle with rounded corners, one of the sides adjacent the right angle extending along the channel.

3. In a wrapping machine having a folding channel, a pair of spaced parallel swinging arms, a bell crank pivoted on the free end of each arm, a transporter bar connected to one arm of each bell crank, a link connecting the other arms of the bell cranks, a member pivoted at one end to the transporter bar, a pivoted bearing in which said member is slidable, a rotating crank pivotally connected to the second end of the member, and article-engaging fingers on the transporter bar, the parts being proportioned and arranged substantially as shown and described to impart to the fingers a parallel movement through a generally triangular closed path one side of which passes along the channel.

4. In a wrapping machine having a folding channel, an article-receiving pocket, and mechanism for moving the pocket into the channel in a straight line, along the channel in a straight line, and back out of the channel in a diagonal direction.

5. In a wrapping mechanism having a folding channel, an article receiving pocket, and mechanism for moving the pocket into the channel in a straight line, along the channel in a second straight line at right angles to the first, and back out of the channel along a curved diagonal path, the front wall of the pocket extending a less distance into the channel than the rear wall to free the article during the initial portion of the travel along said curved path.

6. A wrapping machine comprising a folding chute, means for carrying a severed wrapper sheet across the chute, means for feeding an article along the chute whereby the wrapper is picked up by the article and folded about three sides thereof, a clamp adapted to bear against the sheet at one side of the chute only to hold it in register with that side of the chute, and means for releasing the clamp after the wrapper has been folded around the article a predetermined amount so that the wrapper will be drawn around the article from the unclamped side.

7. A wrapping machine comprising a folding chute, means for carrying a severed wrapper sheet across the chute, means for feeding an article along the chute whereby the wrapper is picked up by the article and folded about three sides thereof, a clamp adapted to bear against the sheet at one side of the chute only to hold it in register with that side of the chute, and mechanism for applying the clamp to the paper at a time prior to the contact of the article therewith and for releasing it when the article has passed a predetermined distance beyond the initial position of the wrapper so that the wrapper will be drawn around the article from the unclamped side.

8. A wrapping machine comprising a folding chute, means for positioning a wrapper sheet across the chute, a plunger for feeding an article along the chute whereby the wrapper is picked up by the article and folded about three sides thereof, an abutment adjacent one edge of the wrapper sheet, a clamp movable against the abutment, and a latch yieldably connecting the clamp and the plunger during a portion of the travel of the plunger and automatically disconnecting the clamp from the plunger when the latter has passed a predetermined distance beyond the initial position of the wrapper.

9. A wrapping machine comprising a folding chute, means for positioning a wrapper sheet across the chute, a plunger for feeding an article along the chute whereby the wrapper is picked up by the article and folded about three sides thereof, an abutment adjacent one edge of the wrapper sheet, a clamp movable against the abutment, a cam on the plunger, and a detent pivoted on the clamp and normally spring held in position to be engaged by the cam.

10. A wrapping machine comprising means for forwarding a partially wrapped article, a semi-cylindrical bar extending with its axis coincident with the path of one side of the article, a spring tending to turn the bar so that its curved side underlies the rear of the article as the article passes it, and a latch timed to hold the bar from full movement under the influence of the spring until after the side of the article lies against the flat side of the bar.

11. A wrapping machine comprising means for forwarding a partially wrapped article, a member spring pressed towards the side of the article to tension the wrapper around it, a latch acting to hold the said member from being pressed by the spring beyond its wrapper tensioning position, and means for releasing the latch when the article reaches a predetermined position so that the member may snap by the end of the article and fold the wrapper around the adjacent article corner.

12. A wrapping machine comprising means for forwarding a partially wrapped article, a member spring pressed towards the side of the article to tension the wrapper around it, a latch acting to hold said member from being pressed by the spring beyond its wrapper tensioning position, means for releasing the latch when the article reaches a predetermined position so that the member may snap by the end of the article and fold the wrapper around the adjacent article corner, and means for resetting the latch.

13. In a wrapping machine of the type having a pair of folding chutes at right angles to each other, devices for forwarding an article through one of said chutes, means for positioning a wrapper across the first chute and in the path of said article so that the article will be placed in position at the entrance to the second chute with the wrapper folded in U-form around it, means for forwarding the partially wrapped article along the second chute, and a folder movable under the rear side of the article; a semi-cylindrical bar extending across the inner corner of intersection of the two chutes with its axis coincident with said corner, a latch holding the bar with its flat side in converging relation to the first chute, a spring tending to rotate the bar in a direction to increase said convergence but normally opposed by the latch, means for releasing the latch at a time when the article is nearly at the end of the first chute, whereby the spring may rotate the bar under the article, to cause it to snub the wrapper around the corner of the article, and to assume a part of the support of the article, and a connection between the bar and the rear folder whereby as the folder advances the bar will be rotated against the spring beyond its original position.

14. A wrapping machine comprising means for forwarding a succession of articles through a path, a folder for acting upon extending portions of the wrappers upon said articles, driving mechanism for said forwarding mechanism and said folder, and a connection between the driving mechanism and the folder displaceable by interference with the movement of the folder whereby the folder is shifted to an inactive position.

15. A wrapping machine comprising means for forwarding a succession of articles through a path, a folder for acting upon extending portions of the wrappers upon said articles, driving mechanism for said forwarding mechanism and said folder, a sleeve movable by the driving mechanism, a bar slidable in the sleeve and connected to the folder, and a spring-pressed pawl normally holding the bar and sleeve together for common movement but permitting the folder to become displaced by interference with its movement and to remain in displaced position until manually reset.

16. A wrapping machine comprising wrapping mechanism, a paper feed, article forwarding mechanism, a main drive, a common drive for the paper feed and the article forwarding mechanism normally driven by said main drive, a conveyer for supplying articles to the machine, means controlled by the absence of an article on the conveyer for disconnecting said common drive from the main drive, and means positively holding the common drive against overrunning when so disconnected.

17. A wrapping machine comprising a main frame, a wrapping channel carried thereby, an elevator frame, an article elevator carried by the elevator frame for elevating articles to said wrapping channel, a paper feed frame, paper feed mechanism carried by the paper feed frame and adapted to deliver sheets of paper into the path of articles on the elevator, a transporter frame, a transporter carried on the transporter frame and adapted to forward articles along the wrapping channel, and devices connecting said elevator, paper feed, and transporter frames to the main frame whereby each group of mechanisms may be removed from the main frame as a separate unit.

18. In a wrapping machine having a frame and a folding channel, a transporter having a plurality of spaced fingers adapted to engage successively the rear of an article to move it along the channel, a member positively driven in a closed orbit and connected to the transporter, a parallel motion linkage connecting the two ends of the transporter, and a second parallel motion linkage supporting the first linkage for full floating movement relative to the frame so that it may follow the motion of the positively driven member.

19. In a wrapping machine having a frame and a folding channel, a transporter having a plurality of spaced fingers adapted to engage successively the rear of an article to move it along the channel, a linkage supporting the transporter for full floating movement in the frame and exerting no constraint upon the transporter except to cause it to move parallel to itself in any motion that may be impressed on it, a member positively driven in a closed orbit, and a connection between said member and the transporter to cause the transporter to follow an orbit similar to that in which said member moves.

20. In a wrapping machine having a folding channel, an elevator movable from a loading position to a position in line with the channel, and article end guides mounted on the elevator; a transporter frame having an article receiving pocket with its sides positioned to grasp the sides of the article intermediate those grasped by the elevator end guides, mechanism for moving the transporter bodily with a parallel motion carrying the pocket in line with the elevator into a position in line with the channel and then in a direction at right angles to its initial line of motion to carry the article along the channel, and timing means coordinating the elevator and the transporter so that they move together in opposite directions towards the entrance to the channel whereby the article is kept always under the control of the end guides or the pocket walls, the elevator then withdraws, and the transporter moves along the right-angled portion of its path to carry the article along the channel.

21. A method of wrapping articles which comprises holding a wrapper across the opening to a folding aperture, placing an article upon the wrapper, clamping one side only of the wrapper relative to the aperture, forcing the article and wrapper into the aperture to initiate the folding of the wrapper about the article whereby the wrapper will be drawn about the article from the unclamped side, and releasing the clamped side of the wrapper after the folding has progressed to a predetermined amount.

22. In a wrapping machine of the type having a folding channel, an elevator movable from a loading position to a position in line with the channel, article end guides mounted on the elevator, and a rear bottom folder and opposed rear end tuckers all movable in a direction in line with and toward the channel; a transporter frame having an article receiving pocket with its sides positioned to grasp the sides of the article intermediate those grasped by the end guides on the elevator, mechanism for moving the transporter bodily with a parallel motion carrying the pocket in line with the elevator into a position adjacent the opening to the channel and then in a direction at right angles to its initial line of motion to carry the article along the channel, the elevator end guides and the rear tuckers being so shaped that they may both engage the article end simultaneously, and timing means coordinating the elevator, the transporter, the rear bottom folder, and the rear end tuckers so that the elevator and the transporter move together in opposite directions toward the entrance to the channel, the rear bottom folder passes under the article and the rear end tuckers engage the article prior to the retraction of the elevator whereby the article is engaged simultaneously on its ends by the end guides and the tuckers, on its bottom by the rear folder, and on its sides by the transporter pocket, the elevator then withdraws, and the transporter moves along the right-angled portion of its path to carry the article along the channel.

23. In a wrapping machine having a folding channel, a pair of spaced parallel swinging arms, a bell crank pivoted on the free end of each arm, a transporter bar connected to one arm of each bell crank, a link connecting the other arms of the bell cranks, a member pivoted at one end to the transporter bar, a pivoted bearing in which said member is slidable, a rotating crank pivotally connected to the second end of the member, article-engaging fingers on the transporter bar, said parts being proportioned and arranged substantially as described to impart to the fingers a parallel movement through a generally triangular closed path one side of which passes along the channel, and means for imparting to the rotating crank a non-uniform angular velocity which is decreased in magnitude at the time when the transporter fingers are going through the slanting portion of their path after leaving the channel.

24. In a wrapping machine having a folding channel, a transporter having article-engaging fingers, mechanism constraining the transporter for movement in a path so that the fingers move with a parallel movement in a straight line into the channel, then in a straight line along the channel, and finally in a diagonal direction back out of the channel, and means for moving the transporter along said path with a velocity the magnitude of which, taken along the line of the path, is at a minimum at the portion of the path formed by the junction of said straight lines.

25. A wrapping machine comprising a folding channel having a base plate and one or more end tucking plates projecting beyond the end of the base plate, means for forwarding along the channel a partially wrapped article having a projecting flap positioned for engagement with the base plate and one or more end extensions positioned for engagement with the tucking plates, a movable member positioned at the end of the base plate, and means for controlling the movements of said member to cause it to project initially beyond the tucking plates and thereby initiate the folding of the flap prior to the engagement of the wrapper end extension with the tucking plates and then to cause said member to recede towards the base plate to a position to the rear of the leading edge of the tucking plates.

26. A wrapping machine comprising a folding channel having a base plate and one or more end tucking plates projecting beyond the end of the base plate, means for moving an article and a wrapper into alignment with the channel with the wrapper draped over three sides of the article with flaps projecting beyond opposite edges of the fourth side, the wrapper also extending beyond at least one end of the article to provide for the formation of end folds, means for moving the article along the channel to cause one projecting flap to be folded against the fourth side of the article by the base plate, a rear folding plate movable over the fourth side of the article towards said base plate to lay down the second projecting flap, one or more end tuckers movable with the folding plate and positioned to engage the wrapper subsequent to its engagement by the folding plate, a movable member adjacent the end of the base plate, and means controlling the movement of said member to cause it to move under the article to cause the first flap to be partially folded onto the fourth article side prior to the engagement of the article with the stationary end tuckers, and then to cause said member to retract towards the base plate to permit close approach of the rear folding plate to the base plate and of the movable tuckers to the stationary tuckers.

27. A wrapping machine comprising a folding channel having a base plate, means for forwarding a partially wrapped article along a right-angled path the second leg of which extends along the channel, a semi-cylindrical bar extending across the channel and rotatable on an axis located substantially at the end of the base plate, the bar being positioned with its flat side generally directed towards the first leg of the article path, its curved side generally directed towards the base plate, and one angle between these sides located at the angle of the article path, and means controlling the motion of the bar so that said corner will be projected under the article as the article comes into line with the channel, and will then move with the article towards the end of the base plate.

FREDERIC B. FULLER.